(12) United States Patent
Matta

(10) Patent No.: US 7,577,453 B2
(45) Date of Patent: Aug. 18, 2009

(54) WIRELESS LOAD BALANCING ACROSS BANDS

(75) Inventor: Sudheer Poorna Chandra Matta, Tracy, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 565 days.

(21) Appl. No.: 11/445,750

(22) Filed: Jun. 1, 2006

(65) Prior Publication Data

US 2007/0281711 A1 Dec. 6, 2007

(51) Int. Cl.
*H04Q 7/20* (2006.01)

(52) U.S. Cl. .............. 455/509; 455/550.1; 455/552.1; 455/553.1; 455/551; 455/422.1; 370/310; 370/328; 370/329; 370/343

(58) Field of Classification Search ............. 455/519, 455/500, 501, 450–453, 550.1, 552.1, 553.1, 455/551, 422.1, 426.1, 426.2, 434, 515, 522, 455/69, 517, 403; 370/310, 328, 329, 343
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |

(Continued)

FOREIGN PATENT DOCUMENTS

WO    WO94/03986    2/1994

(Continued)

OTHER PUBLICATIONS

U.S. Appl. No. 11/487,722, filed Jul. 2006, Simons et al.

(Continued)

*Primary Examiner*—Keith T Ferguson
(74) *Attorney, Agent, or Firm*—Perkins Coie LLP

(57) ABSTRACT

A technique for wireless load balancing involves providing a wireless infrastructure that creates a target band option and helps push clients toward that band. An example of a method according to the technique involves, by way of example but not limitation, responding only to probe requests on a first band when a client is detected on the first band and a second band. For example, using the techniques described herein, a platform that is both 802.11a and 802.11b/g compliant may attempt to connect preferentially to the 802.11b/g band of a wireless network, and be migrated toward the 802.11a band instead.

22 Claims, 7 Drawing Sheets

U.S. PATENT DOCUMENTS

| | | |
|---|---|---|
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | McRae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,078,568 A | 6/2000 | Wright |
| 6,088,591 A | 7/2000 | Trompower |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,285,662 B1 | 9/2001 | Watannabe |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ala-Laurila et al. |
| 6,614,787 B1 | 9/2003 | Jain et al. |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,687,498 B2 | 2/2004 | McKenna et al. |
| 6,725,260 B1 | 4/2004 | Philyaw |
| 6,747,961 B1 | 6/2004 | Ahmed et al. |
| 6,839,338 B1 | 1/2005 | Amara et al. |
| 6,879,812 B2 | 4/2005 | Agrawal et al. |
| 6,973,622 B1 | 12/2005 | Rappaport et al. |
| 6,978,301 B2 | 12/2005 | Tindal |
| 7,020,773 B1 | 3/2006 | Otway et al. |
| 7,110,756 B2 | 9/2006 | Diener |
| 7,139,579 B2 * | 11/2006 | Hatano ............... 455/453 |
| 7,406,069 B2 * | 7/2008 | Yashar et al. ............... 370/338 |
| 2002/0052205 A1 | 5/2002 | Belostofsky |
| 2002/0069278 A1 | 6/2002 | Forslow |
| 2002/0095486 A1 | 7/2002 | Bahl |
| 2002/0101868 A1 | 8/2002 | Clear et al. |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0107590 A1 | 6/2003 | Levillain et al. |
| 2003/0174706 A1 | 9/2003 | Shankar et al. |
| 2004/0025044 A1 | 2/2004 | Day |
| 2004/0047320 A1 | 3/2004 | Eglin |
| 2004/0064560 A1 | 4/2004 | Zhang et al. |
| 2004/0095914 A1 | 5/2004 | Katsube et al. |
| 2004/0095932 A1 | 5/2004 | Astarabadi et al. |
| 2004/0143428 A1 | 7/2004 | Rappaport et al. |
| 2004/0230370 A1 | 11/2004 | Tzamaloukas |
| 2004/0259555 A1 | 12/2004 | Rappaport et al. |
| 2005/0030929 A1 | 2/2005 | Swier et al. |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0128989 A1 | 6/2005 | Bhagwat et al. |
| 2005/0157730 A1 | 7/2005 | Grant et al. |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0240665 A1 | 10/2005 | Gu et al. |
| 2005/0259597 A1 | 11/2005 | Benedetto et al. |
| 2005/0273442 A1 | 12/2005 | Bennett |
| 2005/0276218 A1 | 12/2005 | Ooghe et al. |

| | | | |
|---|---|---|---|
| 2006/0045050 | A1 | 3/2006 | Floros et al. |
| 2006/0073827 | A1* | 4/2006 | Vaisanen et al. ............ 455/436 |
| 2006/0200862 | A1 | 9/2006 | Olson et al. |
| 2006/0227725 | A1* | 10/2006 | Huotari et al. .............. 370/254 |

FOREIGN PATENT DOCUMENTS

| | | |
|---|---|---|
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for MANET. In *Proceedings of the Ninth international Symposium on Computers and Communications 2004* vol. 2 (Iscc"04)—vol. 02 (Jun. 28-Jul. 1, 2004). ISCC. IEEE Computer Society, Washington, DC, 331-338.
U.S. Appl. No. 11/326,966, filed Jan. 5, 2006, Taylor.
U.S. Appl. No. 11/330,877, filed Jan. 11, 2006, Matta.
U.S. Appl. No. 11/331,789, filed Jan. 14, 2006, Matta et al.
U.S. Appl. No. 11/351,104, filed Feb. 8, 2006, Tiwari.
U.S. Appl. No. 11/377,859, filed Mar. 15, 2006, Harkins.
U.S. Appl. No. 11/400,165, filed Apr. 5, 2006, Tiwari.
U.S. Appl. No. 11/417,830, filed May 30, 2006, Morain.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).

Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperlable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.

* cited by examiner

WIRELESS LOAD BALANCING ACROSS BANDS

BACKGROUND

Today, 802.11 wireless networks operate in two frequency bands. 802.11b/g in the 2.4 GHz spectrum and 802.11a in the 5 GHz spectrum. 802.11 wireless clients in most laptops and other devices are shipped with 802.11b/g band as the default band. Indeed, the majority of 802.11 devices are either only in the 802.11b/g band or are preferentially in the 802.11b/g band. In a specific instance at a trade show, it was noted that about 95% of devices at the trade show got onto the 802.11b/g band even though perhaps half of the devices were 802.11a-capable. Over-utilization of the 802.11b/g band can result in throughput degradation and other problems.

It may be beneficial to move "all" 802.11a-capable devices to 802.11a wireless band, and create room in the 802.11b/g band. Most 802.11 Wi-fi phones will be in 802.11b/g band for a long time to come. So moving all the capable data services to the preferred band is welcome move for voice services, so that there are more channels available, for Vo-Wifi services. Moreover, 802.11a may actually have a faster data rate and a higher capacity than the 802.11b/g band, making the 802.11a band even more desirable from a throughput standpoint. In addition, microwaves, cordless phones, and other interfering devices today primarily affect the 2.4 GHz space. So moving normal data services to 802.11a can potentially reduce interference.

Although it may be desirable to migrate wireless clients towards a band that is underutilized, it is not a trivial task and effort is currently being expended to resolve the issues associated with this problem. Even if one band is not necessarily favored, by chance or for other reasons, one band may become over-utilized. In this case, load balancing across the bands may be of value to improve throughput. Proactive techniques may also be of value in ensuring bands are load balanced before the load becomes significantly unbalanced across the bands. On the other hand, migrating wireless clients preferentially from, for example, an 802.11b/g band toward, for example, an 802.11a band can result in over-utilization of the 802.11a band, and a reduction in overall throughput.

These are but a subset of the problems and issues associated with load balancing across bands of a wireless network, and are intended to characterize weaknesses in the prior art by way of example. The foregoing examples of the related art and limitations related therewith are intended to be illustrative and not exclusive. For example, wireless clients may use different protocols other than 802.11, potentially including protocols that have not yet been developed. However, the same problem of excess concentration of users on a single band may persist as long as one band is preferred. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for wireless band load balancing involves providing a wireless infrastructure that creates a target band option and helps migrate clients toward that band. An example of a method according to the technique involves, by way of example but not limitation, responding only to probe requests on a first band when a client is detected on the first band and a second band. This method may create a perception, on the part of the client, that a network is only available on the first band. For example, using the techniques described herein, a platform that is both 802.11a and 802.11b/g compliant may attempt to connect preferentially to the 802.11b/g band of a wireless network, and be migrated toward the 802.11a band instead.

A system according to the technique may include, by way of example but not limitation, a received strength signal indicator (RSSI) module, a targeting module, and a service set identifier (SSID) forwarding module. In a non-limiting embodiment, the RSSI module may determine a first signal strength of a platform on a first wireless band and a second signal strength of the platform on a second wireless band. In a non-limiting embodiment, the targeting module may determine that the first wireless band is a target band. In a non-limiting embodiment, the SSID forwarding module may respond to the platform on the target band.

The proposed system can offer, among other advantages, load balancing across bands of a wireless network, which can result in increased capacity on all of the bands. These and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
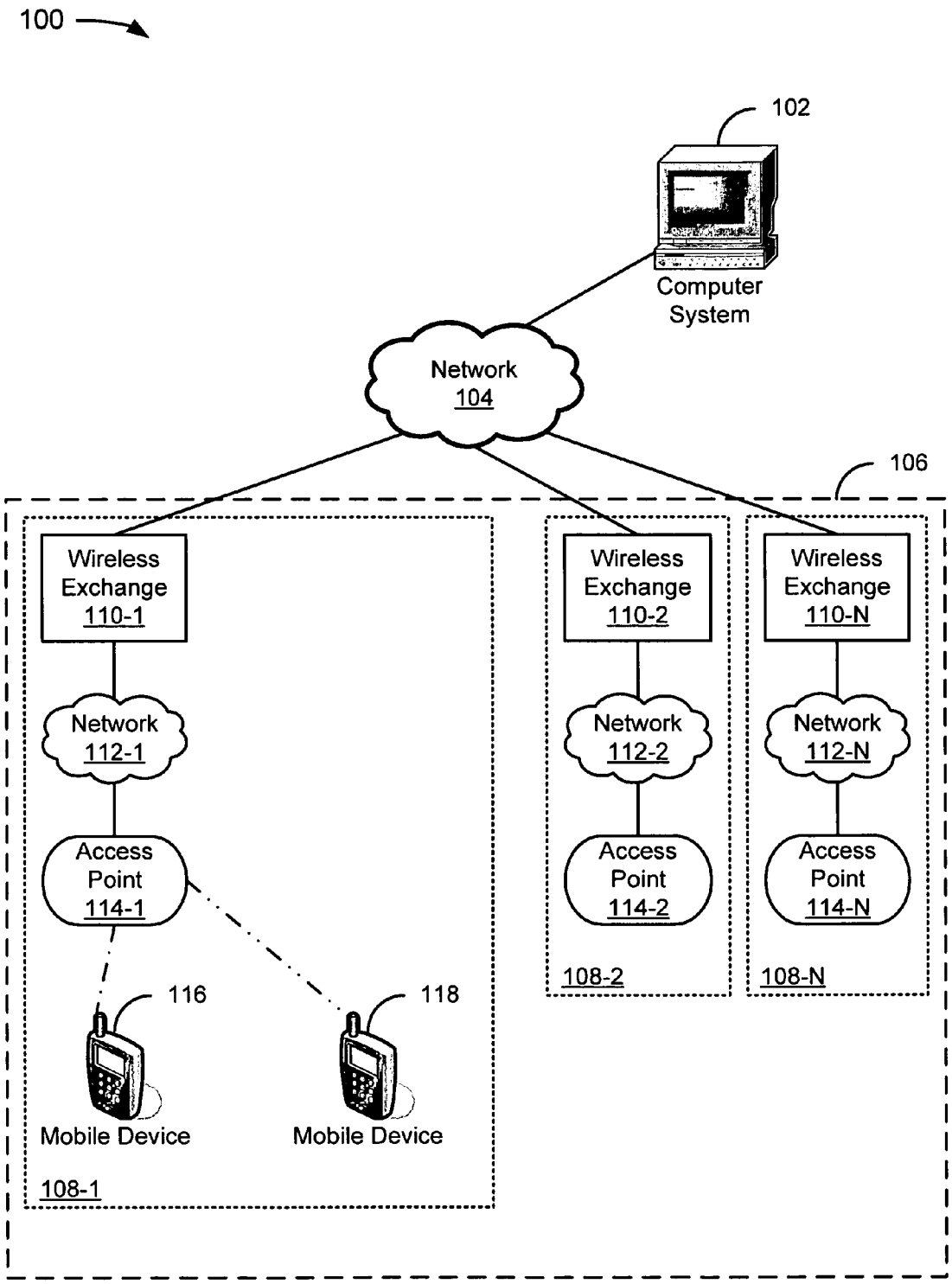
FIG. 1 depicts a system including a wireless access domain.

FIG. 1 depicts a system 100 including a wireless access domain. The system 100 includes a computer system 102, a network 104, and a wireless access domain 106. The system 100 may or may not include multiple wireless access domains. The computer system 102 may be practically any type of device that is capable of communicating with a communications network, such as, by way of example but not limitation, a workstation. The network 104 may be practically any type of communications network, such as, by way of example but not limitation, the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the computer system 102 may be running a program such as, by way of example but not limitation, ethereal, to decode, by way of example but not limitation, IEEE 802.11 standard packets encapsulated in TZSP that are received from the wireless access domain 106. In a non-limiting embodiment, the computer system 102 is connected to a wireless backbone network (not shown), either directly or indirectly through a wireless network.

In a non-limiting embodiment, the network 104 provides a Layer 2 path for Layer 3 traffic, preserving IP addresses, sessions, and other wired Layer 3 attributes as users roam throughout the wireless access domain 106. The network may or may not include a wireless backbone network, or be connected directly or indirectly to a wireless backbone network. Communications between the computer system 102 and the wireless access domain 106 are, therefore, Layer 3 traffic tunneled through Layer 2. Advantageously, by tunneling Layer 3 traffic at Layer 2, users stay connected with the same IP address and keep the same security and Quality of Service (QoS) policies from the wired network while they roam the wireless side. Since Layer 3 attributes are maintained, mobile devices that are connected to the wireless access domain 106 can retain persistent identities.

The seven layers of the Open System Interconnection (OSI) model, of which Layers 2 and 3 are a part, are well-known to those of skill in the relevant art, and are, therefore, not described herein in any substantial detail. It should be noted, however, that Layer 3 is known as the "Network Layer" because it provides switching and routing technologies, creating logical paths, known as virtual circuits, for transmitting data from node to node. Routing and forwarding are functions of this layer, as well as addressing, internetworking, error handling, congestion control and packet sequencing. Layer 2 is known as the "Data Link Layer" because at Layer 2 data packets are encoded and decoded into bits; and Layer 2 furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control, and error checking.

In non-limiting embodiments, the wireless access domain 106 may be referred to as, by way of example but not limitation, a Local Area Network (LAN), virtual LAN (VLAN), and/or wireless LAN (WLAN). The wireless access domain 106 gives each user a persistent identity that can be tracked and managed, no matter where they roam. The wireless access domain 106 may have one or more associated snoop filters. In an embodiment, the wireless access domain 106 may include one or more radios.

In the example of FIG. 1, the wireless access domain 106 includes access areas 108-1 to 108-N (hereinafter collectively referred to as access areas 108). The access areas 108 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 108. In another embodiment, a few parameters, such as the radio name and channel number, must be set separately for each radio. An example of the implementation of a wireless access domain, provided by way of example but not limitation, includes a Trapeze Networks "identity-aware" Mobility Domain™.

In the example of FIG. 1, the following elements are associated with each of the access areas 108: Wireless exchange switches 110-1 to 110-N (hereinafter collectively referred to as wireless exchange switches 110), networks 112-1 to 112-N (hereinafter collectively referred to as networks 112), and access points 114-1 to 114-N (hereinafter collectively referred to as access points 114).

In an embodiment, the wireless exchange switches 110 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). In an embodiment, the wireless exchange switches 110 provide forwarding, queuing, tunneling, and/or some security services for the information the wireless exchange switches 110 receive from their associated access points 114. In another embodiment, the wireless exchange switches 110 coordinate, provide power to, and/or manage the configuration of the associated access points 114. An implementation of a wireless exchange switch, provided by way of example but not limitation, includes a Trapeze Networks Mobility Exchange™ switch. The Trapeze Networks Mobility Exchange™ switches may, in another implementation, be coordinated by means of the Trapeze Access Point Access (TAPA) protocol.

In an embodiment, the networks 112 are simply wired connections from the wireless exchange switches 110 to the access points 114. The networks 112 may or may not be part of a larger network. In a non-limiting embodiment, the networks 112 provides a Layer 2 path for Layer 3 traffic, preserving IP addresses, sessions, and other wired Layer 3 attributes as users roam throughout the wireless access domain 106. Advantageously, by tunneling Layer 3 traffic at Layer 2, users stay connected with the same IP address and keep the same security and Quality of Service (QoS) policies from the wired network while they roam the wireless side.

In a non-limiting embodiment, the access points 114 are hardware units that act as a communication hub by linking wireless mobile 802.11 stations such as PCs to a wired backbone network. In an embodiment, the access points 114 connect users to other users within the network and, in another embodiment, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System™ Mobility Point™ (MP™) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting embodiment, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the access points 114 are stations. Similarly, a wireless client 116 and a wireless client 118, which, in the example of FIG. 1, are depicted for illustrative purposes in the access area 108-1, may be implemented as stations. In alternative embodiments, a station may comply with a different standard than IEEE 802.11, and may have different interfaces to a wireless or other medium.

In the example of FIG. 1, the wireless client 116 and the wireless client 118 are connected to the wireless network through the access point 114-1. For illustrative purposes, the wireless connections of the wireless client 116 and the wireless client 118 are different. For example, the wireless client 116 may be connected to the wireless network over an 802.11a band, while the wireless client 118 may be connected to the wireless network over an 802.11b/g band. Although FIG. 1 is not intended to reflect a physical system but rather serve as a conceptual drawing, the wireless client 118 is assumed to be physically further from the access point 114-1 than the wireless client 116.

In operation, the system 100 may incorporate received strength signal indicator (RSSI) tracking to make clients that are physically far from any access point to associate in the 802.11b/g band even if the clients are heard on the 802.11a band. Alternatively, the physically distant clients may associated in the 802.11b/g band if they are not heard as good on the 802.11a band. This may prevent clients that have weaker 802.11a implementations and that are physically on the outer fringes of wireless networks to still be able to connect to the network and use the network effectively. RSSI tracking is but one example of how to keep clients that are physically distant from an access point to associate in, for example, the 802.11b/g band.

Figure 2:
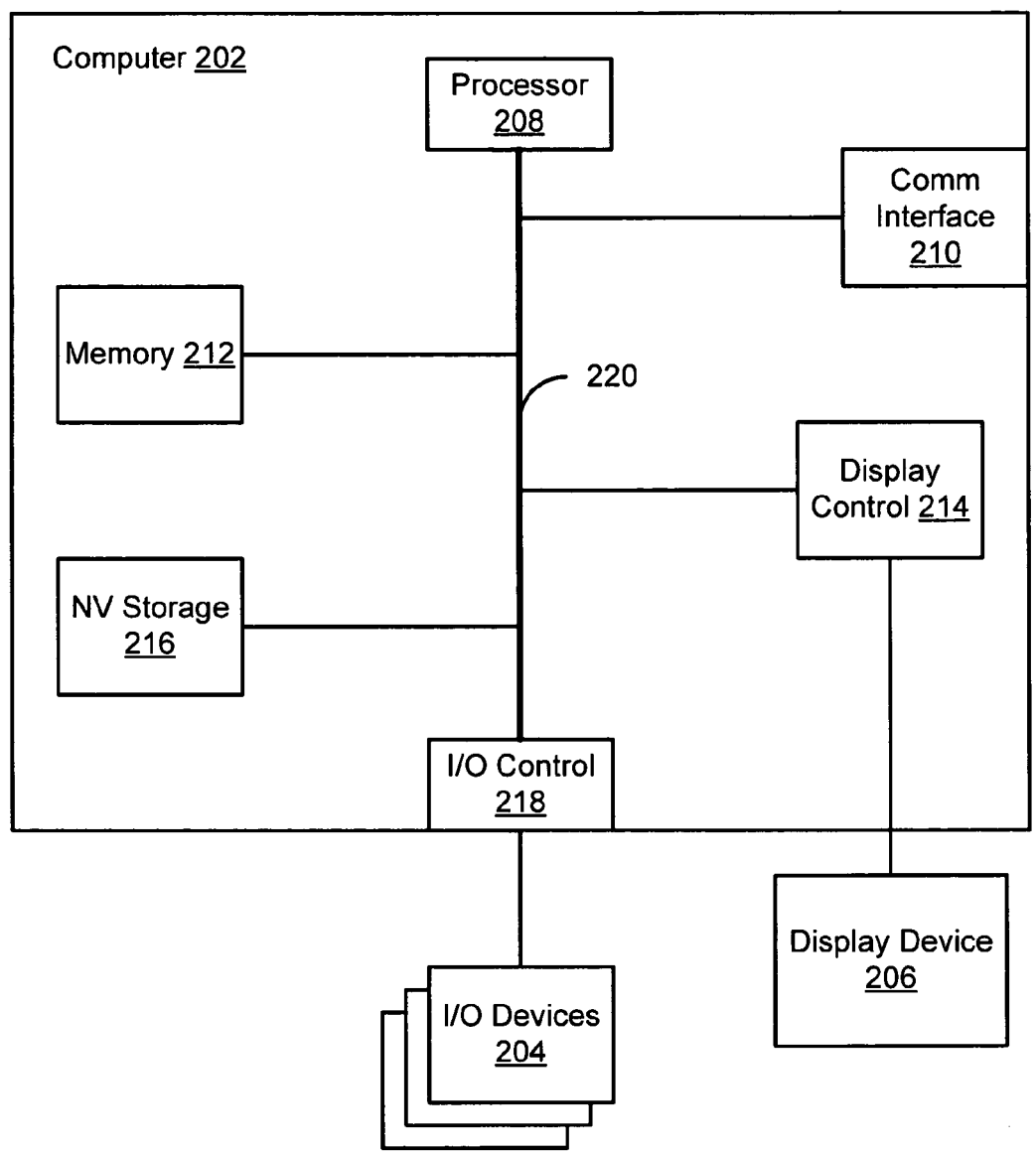
FIG. 2 depicts a computer system for use in the system of FIG. 1.

FIG. 2 depicts a computer system 200 for use in the system 100 (FIG. 1). The computer system 200 may be a conventional computer system that can be used as a client computer system, such as a wireless client or a workstation, or a server computer system. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. It will be appreciated that the communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems.

The processor 208 may be, for example, a conventional microprocessor such as an Intel Pentium microprocessor or Motorola power PC microprocessor. The memory 212 is coupled to the processor 208 by a bus 220. The memory 212 can be Dynamic Random Access Memory (DRAM) and can also include Static RAM (SRAM). The bus 220 couples the processor 208 to the memory 212, also to the non-volatile storage 216, to the display controller 214, and to the I/O controller 218.

The I/O devices 204 can include a keyboard, disk drives, printers, a scanner, and other input and output devices, including a mouse or other pointing device. The display controller 214 may control in the conventional manner a display on the display device 206, which can be, for example, a cathode ray tube (CRT) or liquid crystal display (LCD). The display controller 214 and the I/O controller 218 can be implemented with conventional well known technology.

The non-volatile storage 216 is often a magnetic hard disk, an optical disk, or another form of storage for large amounts of data. Some of this data is often written, by a direct memory access process, into memory 212 during execution of software in the computer 202. One of skill in the art will immediately recognize that the terms "machine-readable medium" or "computer-readable medium" includes any type of storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

In addition, the computer system 200 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 216 and causes the processor 208 to execute the various acts required by the operating system to input and output data and to store data in memory, including storing files on the non-volatile storage 216.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 3:
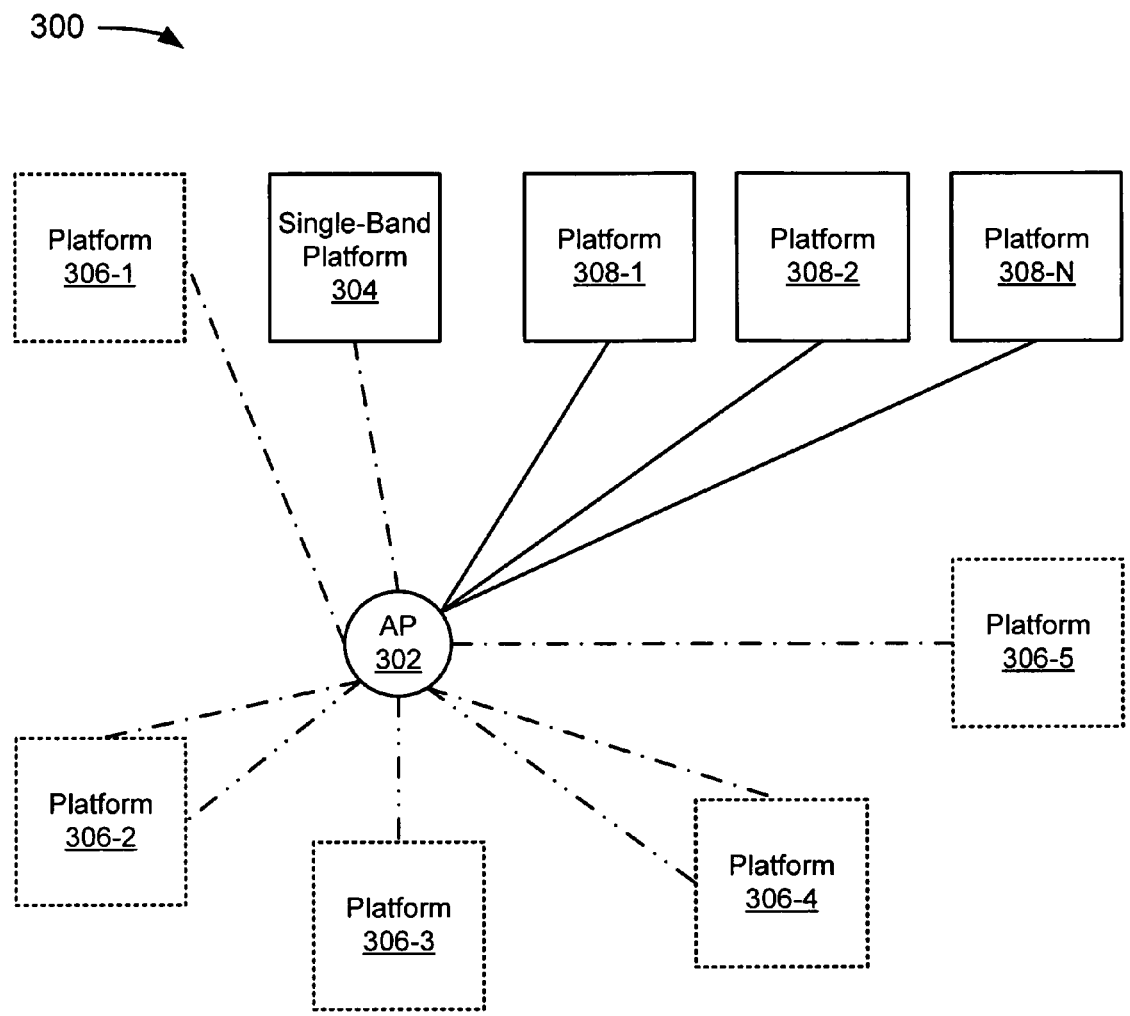
FIG. 3 depicts a conceptual diagram an example of a system including a platform operable on multiple wireless bands.

FIG. 3 depicts a conceptual diagram an example of a system 300 including a platform operable on multiple wireless bands. In the example of FIG. 3, the system 300 includes a wireless access point 302, a single-band platform 304, a moveable platform 306, and a plurality of platforms 308-1 to 308-N (referred to collectively as platforms 308). The moveable platform 306 is depicted in 5 dashed boxes 306-1 to 306-5. As will be described, the moveable platform 306 is so depicted in order to explain changes over time.

In the example of FIG. 3, the single-band platform 304 is connected to a wireless network through the wireless access point 302. The single-band platform 304 may, depending upon the embodiment, implementation, or device, be capable of connecting only on a single band such as, by way of example but not limitation, the 802.11b/g band. Alternatively, the single-band platform 304 may be sending and/or receiving data that would operate most effectively on a single band of a multi-band network. For example, VoIP is preferentially performed on the 802.11b/g band, as opposed to the 802.11a band. Thus, the characterization of the single-band platform 304 may be a self-imposed characterization (e.g., the single-band platform 304 only attempts to connect over a preferred band).

In the example of FIG. 3, the platform 306 is depicted as changing over time (platform 306-1 to 306-5). At the time period associated with 306-1, the platform 306 is connected to the wireless network over a first band. The first band may be a preferred band (e.g., some devices that are multi-band capable preferentially attempt to connect over the 802.11b/g band). Alternatively, the first band may have a stronger associated signal.

Figure 4:
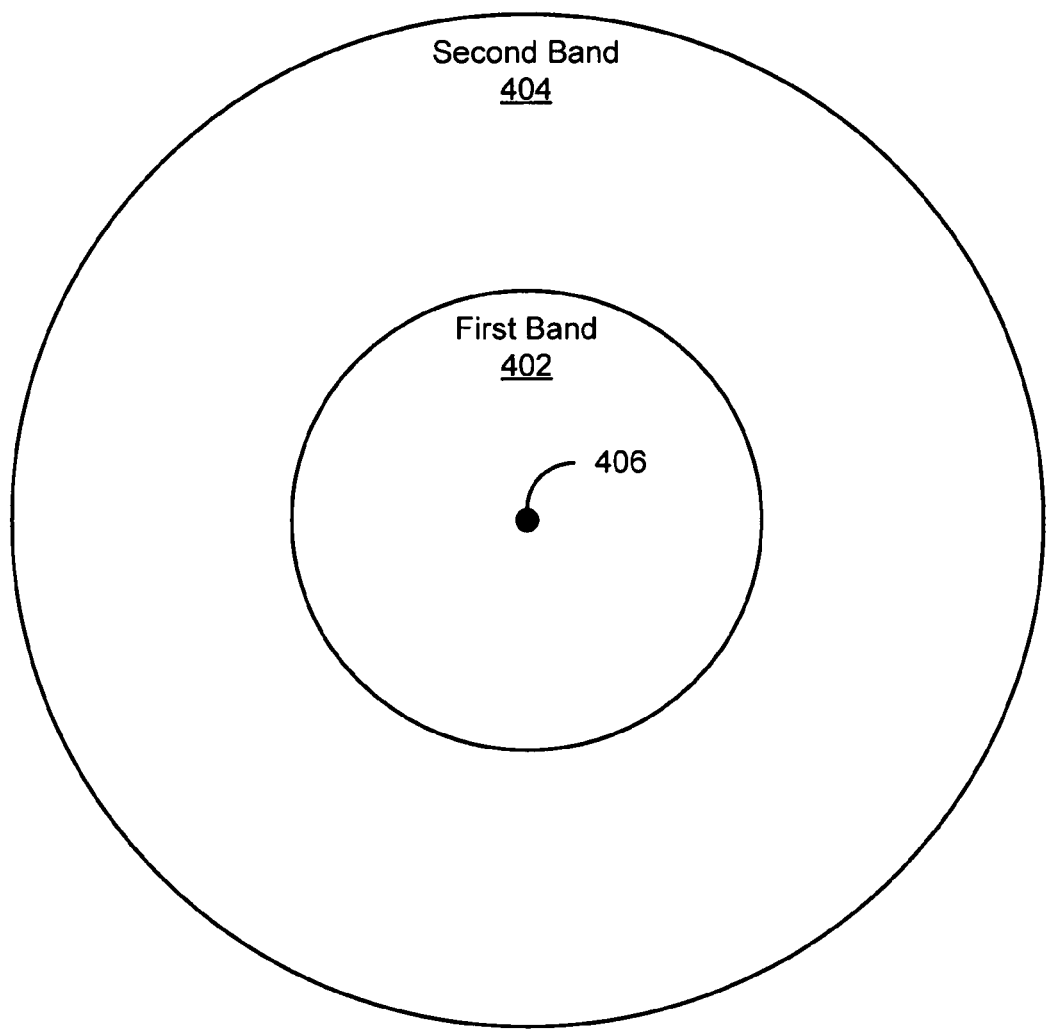
FIG. 4 depicts a graphic illustration in which an acceptable signal strength threshold is met for two bands.

FIG. 4 depicts a graphic illustration 400 in which an acceptable signal strength threshold is met for two bands. In the example of FIG. 4, the first band 402 has a wider radius of coverage from a central point 406, which may be an access point, compared to the radius of coverage of a second band 404. By way of example but not limitation, the first band 402 may be an 802.11b/g band and the second band 404 may be an 802.11a band. 802.11b/g typically has a larger radius of coverage compared to 802.11a for reasons, such as data rate associated with the bands, that are known to one of skill in the art. It may be noted that the first band 402 and the second band 404 could have different coverage based on other factors including, but not limited to, interference in one of the bands, an environment that relatively favors one band, a weaker transmitter or receiver on one of the bands (either on the platform or at the wireless access point), or some other factor.

Referring once again to FIG. 3, at the time period associated with 306-2, the platform 306 remains connected via the first band, but signals are sent over a second band. It may be noted that the signals may have been sent during the time period associated with 306-1 as well, but a distinction is drawn for illustrative purposes only. The access point 302 (or some device higher up, such as a switch or a server) determines whether a connection should be made via the first band or the second band. The determination may be based on, for example, whether it is desirable to keep the first band as clear as possible of traffic so that the single-band platform 304 can connect via the first band, the amount of traffic on the first and second bands from the platforms 308, the RSSI of the platform 306 is higher on the first band or the second band, or other factors, or a combination of factors. In an embodiment, the time period associated with 306-2 lasts for a predetermined period of time, although the period of time may be dynamic (e.g., quicker when RSSI changes rapidly or quicker if traffic is exceptionally heavy on one band or the other) or arbitrary.

In the example of FIG. 3, when the access point 302 has heard, for example, probe requests from the platform 306 for a period of time, at the time period associated with 306-3, the platform 306 is connected via the second band, and the access point 302 may stop responding to probe requests on the first band. When the access point 302 stops responding to the platform 306 on the first band, this simulates to the platform 306 as if a service set identifier (SSID) associated with the second band is the only one being offered. As is known in the relevant art, a SSID is a sequence of characters that uniquely names a WLAN.

In an embodiment, the platforms 308 are connected to the wireless network over the first band if possible, and over the second band if far away or if the platform is single-band only. It should be noted that this is not necessarily a bad thing. For example, if the second band is 802.11b/g and the first band is 802.11a, measurements of throughput have shown that devices today tend toward the 802.11b/g band and some devices are not capable of accessing the 802.11a band. It is estimated that even if the migration is performed toward 802.11a when signal strength is good, throughput may be maintained, in many instances, at a reasonable level.

In the example of FIG. 3, at the time period associated with 306-4, the access point 302 entertains the option of enabling the platform 306 to switch from the first band back to the second band. For example, the platform at the time period associated with 306-4 may have poor signal quality on the first band. Again, the access point 302 (or some other device) may consider multiple factors when deciding whether switching back to the second band is appropriate. For example, the access point 302 may be able to determine that the platform 306 is on the fringe of the radius of coverage of the first band by comparing RSSI values to a range of acceptable values. If the platform 306 drops below an acceptable RSSI threshold, the access point 302 can, potentially seamlessly, enable probe responses on the second band.

It may be noted that the RSSI threshold may be a static or dynamic value. By way of example but not limitation, the RSSI threshold may be the highest RSSI value other than the current band. In such an embodiment, the RSSI value could remain relatively steady over time, but the RSSI threshold could rise, causing the RSSI value to become unacceptable.

In the example of FIG. 3, at the time period associated with 306-5, the platform 306 is back on the second band. In the near future, it is predicted that VoIP wireless devices will continue to dominate the 802.11b/g band. Advantageously, this technique can migrate non-VoIP devices away from the 802.11b/g band, freeing up the band for VoIP. However, as previously mentioned, it may be desirable to allow access by non-VoIP devices under certain circumstances (e.g., the devices do not exceed an acceptable RSSI threshold on the other band or bands) that have just been described with reference to FIG. 3.

Although the techniques have been described with respect to two bands, 802.11a and 802.11b/g, where 802.11a is the target band to which devices are migrated, the techniques could be used in conjunction with a third (fourth, etc.) band. For more than two protocols, devices may be migrated toward a target band of the more than two bands. In certain cases, devices may be unable to migrate toward the target band (e.g., because the devices are not capable of operating on the target band) or migration toward the target band is undesirable (e.g., because of signal strength, data rate, and/or other factors). Although the techniques have been described with respect to two bands, 802.11a and 802.11b/g, the techniques could be used in conjunction with a different standard (or two or more protocols). For protocols other than 802.11, the technique is readily applicable.

In an embodiment, one of the factors used in load balancing may be access point occupancy. For example, access points may have overlapping areas of coverage. If it is determined that a first access point is busier than a second access point, the system may preferentially migrate the platform from the first access point to the second access point.

In an embodiment, the target band is adjustable. For example, if it is determined that a band other than the target band would be more advantageous as a target band, then the other band can be set as the target band. As before, certain characteristics of non-target bands may override the preference (e.g., if signal strength does not exceed an acceptable RSSI threshold, or if the data is of a particular type).

Figure 5:
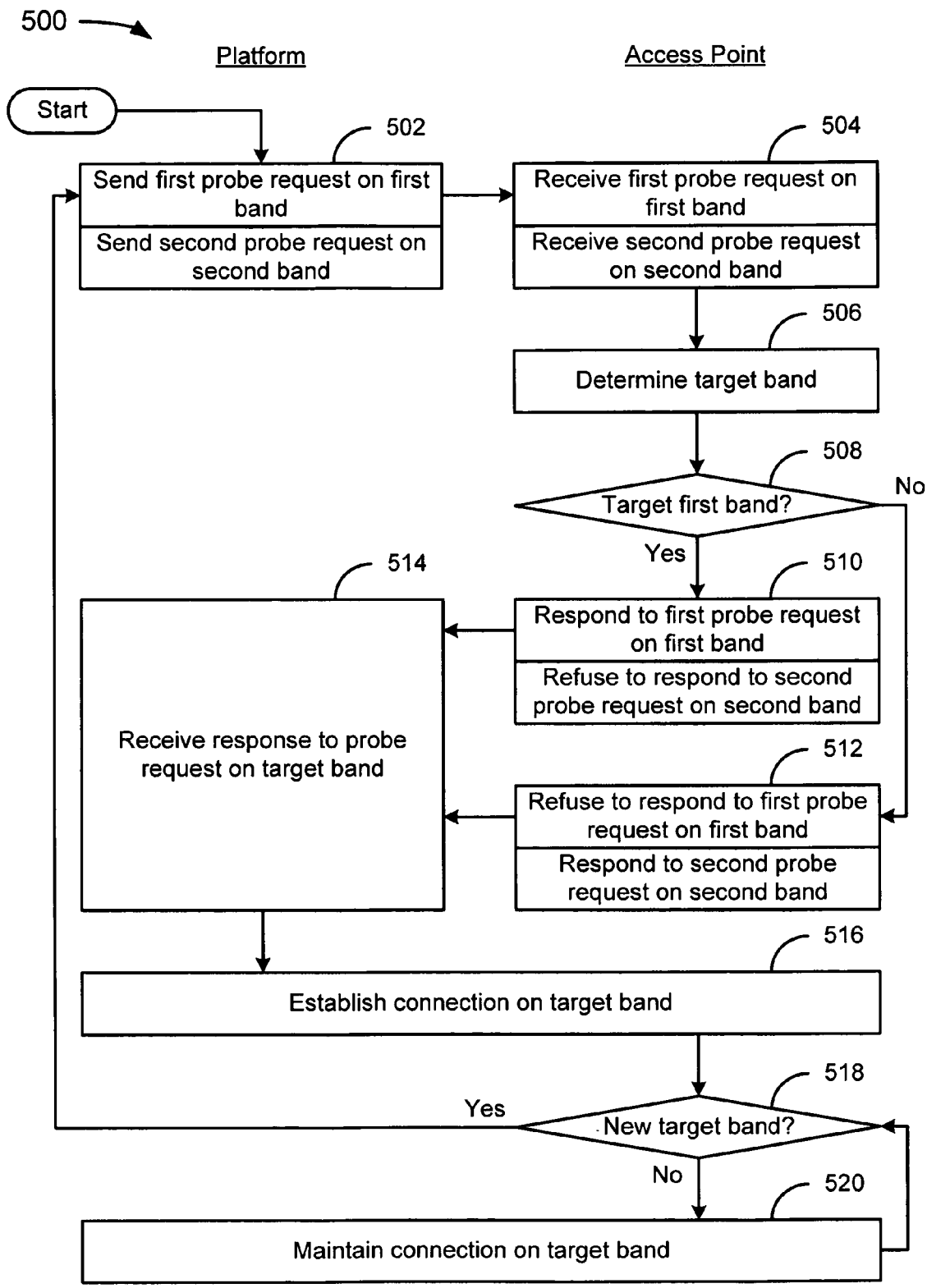
FIG. 5 depicts a flowchart of an example of a method for load balancing a wireless network.

FIG. 5 depicts a flowchart 500 of an example of a method for load balancing a wireless network. This method and other methods are depicted as serially arranged modules. However, modules of the methods may be reordered, or arranged for parallel execution as appropriate. FIG. 5 is intended to illustrate a first example of operation of a system such as that depicted in FIG. 3, using the techniques described herein. In the example of FIG. 5, the flowchart is arranged such that, in general, modules associated with a platform are on the left-hand side and modules associated with an access point are on the right-hand side. This organization is for illustrative purposes only.

In the example of FIG. 5, the flowchart 500 starts at module 502 where a first probe request is sent from the platform on a first band, and a second probe request is sent from the platform on a second band. Implicit in module 502 is that the platform is capable of sending probe requests on at least two bands. However, the platform may be capable of operating on more than two bands, and may therefore send probe requests on more than two bands.

In the example of FIG. 5, the flowchart 500 continues to module 504 where the first probe request is received at the access point on the first band, and the second probe request is received at the access point on the second band. Implicit in module 504 is that the access point is capable of sending probe request on at least two bands. However, the platform may be capable of operating on more than two bands, and may or may not receive probe requests on more than two bands. It should be noted that an access point could be configured to operate on only one band. In such a case, multiple access points capable of operation on multiple bands could be used together to gain at least some of the advantages associated with this technique.

In the example of FIG. 5, the flowchart 500 continues to module 506 where the access point determines the target band. The target band may be determined in a number of ways. For example, a human or software agent may arbitrarily (or for reasons not considered by the system) select a target band. As another example, the target band may be selected using network traffic considerations such as congestion on one or more bands, available bandwidth on one or more of the bands, high or low throughput on one or more of the bands, etc. As another example, the target band may be selected on a platform-by-platform basis, such as based upon signal strengths associated with a platform on the various bands.

In the example of FIG. 5, the flowchart 500 continues to decision point 508 where it is determined whether to target the first band. It should be noted that the example of FIG. 5 describes only a first and second band, but the target band could be chosen from any number of bands. If it is determined that the first band is the target band (508—Yes), then the flowchart continues to module 510 where the access point responds to the first probe request on the first band, and refuses to respond to the second probe request on the second band. If, on the other hand, it is determined that the second band is the target band (508—No), then the flowchart continues to module 512 where the access point refuses to respond to the first probe request on the first band, and responds to the second probe request on the second band.

In the example of FIG. 5, the flowchart 500 continues to module 514 where the response to probe request is received at the platform on the target band. Depending upon the determination at module 506, the target band may be either the first band or the second band. It should be noted that since the platform only received a response to probe request on the target band, and not the other band, from the perspective of the platform, only the target band is currently available.

In the example of FIG. 5, the flowchart 500 continues to module 516 where a connection is established on the target band. The connection may be established between the platform and the access point by any known or convenient protocol, procedure, or means.

In the example of FIG. 5, the flowchart 500 continues to decision point 518 where it is determined whether to select a new target band. The determination may be based on factors similar to those described with respect to module 506. By way of example but not limitation, it may be desirable to select a new target band if a detected signal strength on the target band drops below an acceptable signal strength threshold, or if the signal strength on the target band is lower than on a non-target band by a certain margin. If it is determined that an attempt to select a new target band should be made (518—Yes), then the flowchart 500 returns to the beginning (module 502) and proceeds as described above. If, on the other hand, it is determined that an attempt to select a new target band should not be made (518—No), then the flowchart 500 continues to module 520 where the connection is maintained on the target band, and the flowchart returns to decision point 518 and repeats until it is determined that an attempt should be made to select a new target band, if ever.

Figure 6:
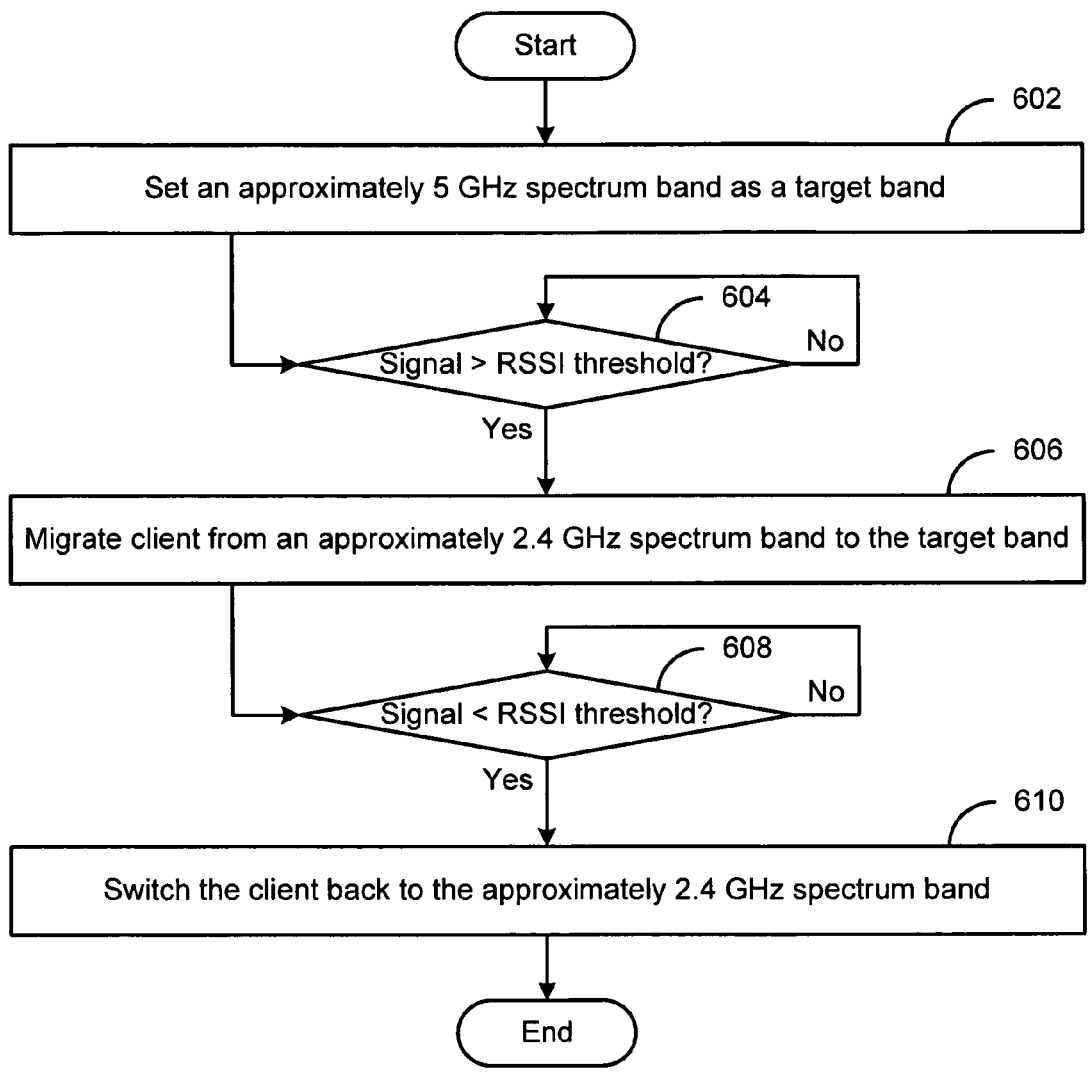
FIG. 6 depicts a flowchart of an example of a method for wireless load balancing on 5 GHz and 2.4 GHz spectral bands.

FIG. 6 depicts a flowchart 600 of an example of a method for wireless load balancing on 5 GHz (which may or may not include an 802.11b/g band) and 2.4 GHz (which may or may not include an 802.11a band) spectrum bands. The flowchart 600 begins at module 602 where an approximately 5 GHz spectrum band is set as a target band. The setting of the target band may be based upon any known or convenient load balancing considerations including but not limited to traffic characteristics on the various bands, platform characteristics, access point characteristics, or other characteristics. In an embodiment, the target band can be changed at a later time.

In the example of FIG. 6, the flowchart 600 continues to decision point 604 where it is determined whether a detected signal on the target band is higher than an RSSI threshold. If not (604—No), the flowchart 600 repeats decision point 604 until this condition is true, if ever. If, on the other hand, it is determined that the detected signal on the target band is higher than the RSSI threshold (604—Yes), then the flowchart 600 continues to module 606 where a client associated with the detected signal strength is migrated from the 2.4 GHz spectrum band to the target band. In an embodiment that includes multiple other bands (besides the 2.4 GHz spectrum band), the migration may be carried out for clients on those other bands. In another embodiment, all clients that are compatible with the target band may be migrated from the 2.4 GHz spectrum band to the target band if the respective detected signal strengths exceed the RSSI threshold.

In the example of FIG. 6, the flowchart 600 continues to decision point 608 where it is determined whether a detected signal on the target band has dropped below the RSSI threshold. If not (608—No), then the flowchart 600 repeats decision point 608 until this condition is true, if ever. If, on the other hand, it is determined that the detected signal on the target band has dropped below the RSSI threshold (608—Yes), then the flowchart 600 continues to module 610 where the client is switched back to the 2.4 GHz spectrum band. At this point, the flowchart 600 ends. Of course, depending upon the embodiment and/or implementation, the client could presumably switch between bands any number of times.

In an embodiment, the method may further include disabling the migrating and switching based upon network traffic characteristics. For example, congestion on one or more bands may result in an override of the signal strength-dependent migration.

Figure 7:
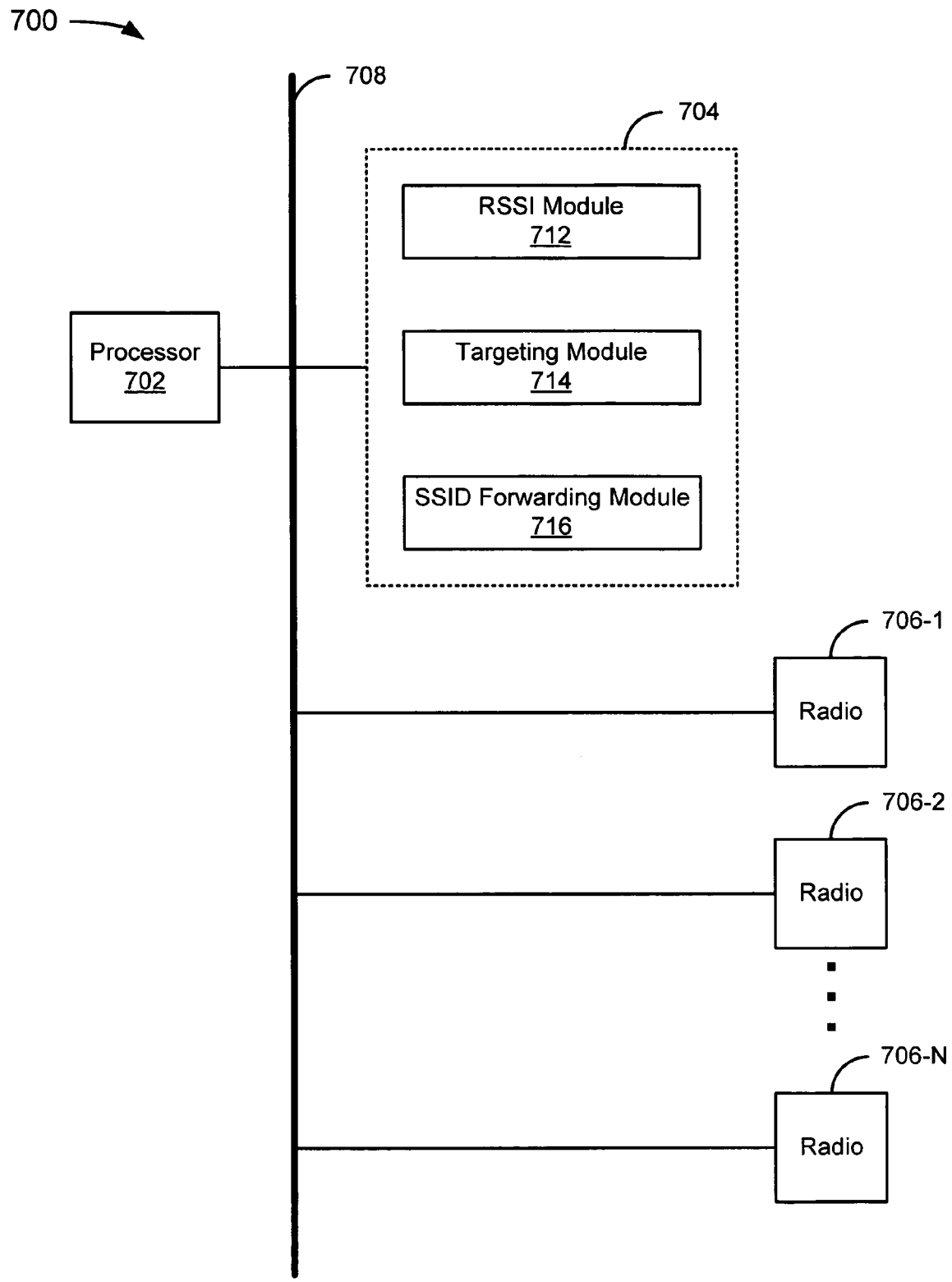
FIG. 7 depicts an example of a wireless band load balancing device.

FIG. 7 depicts an example of a wireless band load balancing device 700. The device 700 may be, by way of example but not limitation, a wireless access point. In the example of FIG. 7, the device 700 includes a processor 702, memory 704, and radios 706-1 to 706-N (referred to collectively as radios 706), coupled to a bus 708. It may be noted that the bus architecture is optional, and is selected for ease of illustration, but any applicable known or convenient architecture would suffice.

In the example of FIG. 7, the memory 704, which may include volatile and/or non-volatile storage, or software, firmware, and/or hardware components, includes an RSSI module 712, a targeting module 714, and an SSID forwarding module 716. While the modules 712, 714, and 716 are depicted as residing locally on the device 700, one, some, or all of the modules could instead be located on another remote device, such as a switch, a server, or some other computer.

In the example of FIG. 7, the radios 706 are intended to represent radios on different bands. However, a single radio could be used to cover multiple bands, or multiple radios could cover a single band, depending upon implementation. For illustrative purposes only, it is assumed that the radios 706 are associated with different bands.

In operation, the radios 706 receive signals from platforms (not shown). The signals are evaluated by the RSSI module to determine the strength of the signals. It may be noted that since the RSSI module typically receives a subset of all signals sent by the platforms, so the RSSI value associated with a signal is an estimation of actual average signals strength. In general, the larger the sample, the greater the accuracy. Each signal has an RSSI value. For example, if a platform has signals sampled on each of the bands, each of the signals have an RSSI value. If multiple signals associated with a platform are sampled on a single band, the RSSI value may be an average of the signals.

In operation, the targeting module 714 determines which band is a targeted band. The determination may be made by assignment, consideration of traffic characteristics, using RSSI values on a platform-by-platform basis, or by some other means or combination. For example, if the targeting module 714 determines the target band based on RSSI values for a platform on the various bands, the targeting module 714 may select the band with the highest associated RSSI values as the target band. As another example, the targeting module 714 may require that certain bands have a higher associated RSSI value by a margin. As another example, RSSI values may be weighted depending upon traffic characteristics of the associated bands.

In operation, when the targeting module 714 establishes a target band, the SSID forwarding module 716 sends a message, through the associated radio, to the relevant platform. For example, the SSID forwarding module 716 may respond to probe requests from a platform on the target band. Notably, in an embodiment that uses probe requests, the SSID forwarding module 716 refuses to response to probe requests on non-target bands. Thus, the platform will believe it has only a single choice—the target band.

It may be noted that the description above applies to platforms that are attempting to connect to a wireless network for the first time, or attempting to reconnect. For example, the RSSI module may determine that RSSI values are higher on a first band initially, the first band becoming the target band, but that RSSI values are higher on a second band later, and change the target band to the second band in response.

As used herein, a wireless network refers to any type of wireless network, including but not limited to a structured network or an ad hoc network. Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method comprising:
   receiving from a wireless device a first probe request on a first band and a second probe request on a second band;
   responding to the first probe request on the first band;
   refusing to respond to the second probe request on the second band;
   wherein responding to the first probe request and refusing to respond to the second probe request creates an impression at the wireless device that a first service set identifier (SSID) is unavailable on the second band;
   wherein, in response to a received strength signal indicator (RSSI) on the first band dropping below an acceptable signal threshold:
      responding to a third probe request on the second band;
      refusing to respond to a fourth probe request on the first band;
         wherein the responding to the third probe request and refusing to respond to the fourth probe request creates an impression at the wireless device that a second SSID is unavailable on the first band.

2. The method of claim 1, further comprising connecting the wireless device to a wireless network on the second band if a received strength signal indicator (RSSI) on the first band is below an acceptable signal threshold.

3. The method of claim 1, further comprising connecting the wireless device to a wireless network on the first band after creating the impression at the wireless device that the first SSID is unavailable on the second band.

4. The method of claim 1, wherein the first SSID and the second SSID are identical.

5. The method of claim 1, wherein the refusing to respond to the second probe request is in response to congestion on the second band.

6. The method of claim 1, wherein the refusing to respond to the second probe request is in response to detection of a stronger signal on the first band than on the second band.

7. The method of claim 1, wherein the refusing to respond to the second probe request is an attempt to load balance across the first band and the second band.

8. The method of claim 1, further comprising determining that the first band is a target band using available data.

9. The method of claim 1, further comprising selecting the first band as a target band.

10. The method of claim 1, further comprising accepting input that the first band is a target band.

11. A system comprising:
   memory having executable modules stored therein;
   a processor coupled to the memory and capable of executing the executable modules stored in the memory;
   a first radio, coupled to the memory, associated with a first wireless band;
   a second radio, coupled to the memory, associated with a second wireless band;
   said memory including:
      a received strength signal indicator (RSSI) module for determining a first signal strength of a platform on the first wireless band and a second signal strength of the platform on the second wireless band;
      a targeting module for determining that the first wireless band is a target band;
      a service set identifier (SSID) forwarding module for responding to the platform on the target band;
   wherein, in operation, the platform is unaware the second band is available and accordingly connects on the first band.

12. The system of claim 11, wherein the platform is capable of connecting on either the first band or the second band.

13. A system comprising:
   means for receiving from a wireless device a first probe request on a first band and a second probe request on a second band;
   means for responding to the first probe request on the first band;
   means for refusing to respond to the second probe request on the second band;
   wherein responding to the first probe request and refusing to respond to the second probe request creates an impression at the wireless device that a first service set identifier (SSID) is unavailable on the second band;
   wherein, in response to a received strength signal indicator (RSSI) on the first band dropping below an acceptable signal threshold:
      responding to a third probe request on the second band;
      refusing to respond to a fourth probe request on the first band;
         wherein the responding to the third probe request and refusing to respond to the fourth probe request creates an impression at the wireless device that a second SSID is unavailable on the first band.

14. The system of claim 13, further comprising means for connecting the wireless device to a wireless network on the second band if a received strength signal indicator (RSSI) on the first band is below an acceptable signal threshold.

15. The system of claim 13, further comprising means for connecting the wireless device to a wireless network on the first band after creating the impression at the wireless device that the first SSID is unavailable on the second band.

16. The system of claim 13, wherein the first SSID and the second SSID are identical.

17. The system of claim 13, wherein the refusing to respond to the second probe request is in response to congestion on the second band.

18. The system of claim 13, wherein the refusing to respond to the second probe request is in response to detection of a stronger signal on the first band than on the second band.

19. The system of claim 13, wherein the refusing to respond to the second probe request is an attempt to load balance across the first band and the second band.

20. The system of claim 13, further comprising means for determining that the first band is a target band using available data.

21. The system of claim 13, further comprising means for selecting the first band as a target band.

22. The system of claim 13, further comprising means for accepting input that the first band is a target band.

* * * * *